(12) United States Patent
Tsubota et al.

(10) Patent No.: US 8,365,613 B2
(45) Date of Patent: Feb. 5, 2013

(54) CORIOLIS MASS FLOW METER HAVING EXTERNAL VIBRATION ISOLATION MEMBER

(75) Inventors: Hiroshi Tsubota, Osaka (JP); Katsunari Koyama, Osaka (JP)

(73) Assignee: Keyence Corporation, Osaka (JP)

( * ) Notice: Subject to any disclaimer, the term of this patent is extended or adjusted under 35 U.S.C. 154(b) by 355 days.

(21) Appl. No.: 12/793,722

(22) Filed: Jun. 4, 2010

(65) Prior Publication Data

US 2011/0000315 A1    Jan. 6, 2011

(30) Foreign Application Priority Data

Jul. 3, 2009    (JP) .................................. 2009-159260

(51) Int. Cl.
*G01F 1/84* (2006.01)
(52) U.S. Cl. .................................................. 73/861.355
(58) Field of Classification Search .................. None
See application file for complete search history.

(56) References Cited

U.S. PATENT DOCUMENTS

| | | | | |
|---|---|---|---|---|
| 4,422,338 A * | 12/1983 | Smith | ...................... | 73/861.356 |
| 4,756,198 A | 7/1988 | Levien | | |
| 5,526,698 A * | 6/1996 | Sakurai et al. | ............. | 73/861.12 |
| 5,705,754 A * | 1/1998 | Keita et al. | ............... | 73/861.357 |
| 5,918,285 A | 6/1999 | Van der Pol | | |
| 6,343,517 B1 * | 2/2002 | Van Cleve et al. | ........ | 73/861.357 |
| 6,588,284 B1 * | 7/2003 | Shiraishi et al. | .......... | 73/861.355 |
| 6,718,615 B2 * | 4/2004 | Van Cleve et al. | ........... | 29/592.1 |
| 6,807,866 B2 * | 10/2004 | Drahm et al. | ............ | 73/861.355 |
| 6,895,826 B1 * | 5/2005 | Nakao et al. | ............. | 73/861.355 |
| 2002/0014125 A1 * | 2/2002 | Cleve et al. | .............. | 73/861.357 |
| 2002/0144557 A1 * | 10/2002 | Drahm et al. | ............ | 73/861.355 |
| 2009/0173167 A1 | 7/2009 | Takayanagi | | |
| 2010/0000334 A1 | 1/2010 | Katsurada | | |
| 2010/0005906 A1 | 1/2010 | Shimizu et al. | | |
| 2011/0000316 A1 * | 1/2011 | Shimizu et al. | .......... | 73/861.357 |

FOREIGN PATENT DOCUMENTS

| | | |
|---|---|---|
| JP | 64-015921 | 1/1989 |
| JP | 02-006954 | 2/1990 |
| JP | 06-029689 | 8/1994 |
| JP | 2850556 | 11/1998 |
| JP | 11-510608 | 9/1999 |
| JP | 11-337383 | 12/1999 |
| JP | 2003-207380 | 7/2003 |
| WO | 91/08448 A1 | 6/1991 |
| WO | 97/44640 A1 | 11/1997 |

* cited by examiner

*Primary Examiner* — Harshad R Patel
(74) *Attorney, Agent, or Firm* — Kilyk & Bowersox, P.L.L.C.

(57) ABSTRACT

For reducing an influence due to an external vibration, a frame has: a main frame that supports a vibration tube in a cantilever state; and a subframe that extends from the main frame toward a measurement portion side of the vibration tube, a detector and a vibration exciter are arranged on this subframe, and the outer case that surrounds the frame, the vibration tube and the like is engaged with the frame through the vibration isolating member.

8 Claims, 14 Drawing Sheets

F I G. 9
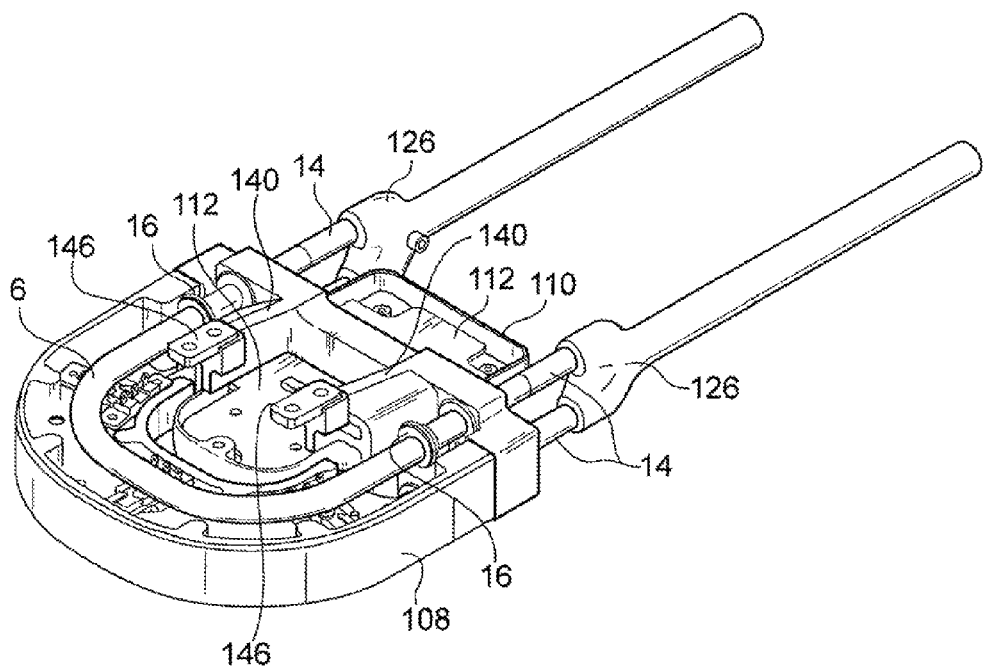

CORIOLIS MASS FLOW METER HAVING EXTERNAL VIBRATION ISOLATION MEMBER

CROSS-REFERENCE TO RELATED APPLICATIONS

The present application claims foreign priority based on Japanese Patent Application No. 2009-159260, filed Jul. 3, 2009, the contents of which is incorporated herein by reference.

BACKGROUND OF THE INVENTION

1. Field of the Invention

The present invention relates to a Coriolis mass flow meter and, more specifically, relates to a small-sized mass flow meter applicable to measurement of a minute flow rate.

2. Description of the Background Art

Since a Coriolis mass flow meter has an advantage of being capable of directly measuring a mass flow rate with accuracy, historically, its application started to measure a large flow rate, and has recently been expanded to measure a minute flow rate.

A principle of the Coriolis mass flow meter is as follows. When a central portion of a vibration tube in an axial-line direction whose a fluid flows is excited, Coriolis forces act in opposite directions in an inlet side portion and an outlet side portion of the vibration tube, and the Coriolis forces in the opposite directions cause generation of twist in the vibration tube. This twist is proportional to the mass flow rate. This twist of the vibration tube is detected as a vibration displacement, a velocity phase difference, or the like between the upstream side and the downstream side in a flowing direction of a fluid with the vibration exciter interposed therebetween, to obtain a mass flow rate from this phase difference or the like.

There have already been proposed vibration tubes having a variety of shapes in Coriolis mass flow meters. The vibration tubes can be broadly divided into a straight tube type which is straight and a curved tube type provided with a curved portion. The curved tube type is typically classified into a type of the inlet and the outlet of the vibration tube being located on the same side and a type of the inlet and the outlet being located on the opposite sides. As for the former type, namely the type of the inlet and the outlet being located on the same side, those having a U-shape in a planar view, a shape of a narrowed space between the inlet and the outlet (Japanese Unexamined Patent Publication No. 2003-207380), a loop shape, and the like are known. Further, the Coriolis mass flow meters are classified, based upon the number of vibration tubes, into a single tube type and a dual tube type (Japanese Unexamined Patent Publication No. 2003-207380 and U.S. Pat. No. 4,756,198) provided with two vibration tubes.

Japanese Unexamined Patent Publication No. 2003-207380 discloses a dual tube type Coriolis mass flow meter, to which two curved tube type vibration tubes that vibrate as a tuning fork, namely a pair of vibration tube, are adopted for the purpose of application to a fluid with a minute flow rate. It is pointed out as reasons for adopting the two curved tube type vibration tubes that a single tube type has a low drive efficiency and is unbalanced when vibrated, thereby causing the problem of occurrence of vibration leakage, and that the single tube type requires a frame structure with enhanced rigidity to support the detector, namely rigidity against vibrations.

Here, the vibration leakage is described. With a pair of vibration tubes ideally vibrating in a mirror-symmetrical manner, a vibration due to a self-excited vibration is offset on the frame. However, this is an ideal theory, and the tubes are in effect not completely mirror-symmetrical because of their material properties, shapes, assemblies, or the like being non-homogeneous, nonuniform, or asymmetrical. Hence, the vibrating states in minute vibrations of the vibration tubes associated with the frame or an external pipe vary depending upon the assembled states thereof. This leads to an offset of a zero point of a measured value. This phenomenon is referred to as the vibration leakage. This vibration leakage occurs independently from a vibration from the outside as a disturbance element.

A vibration tube using a metal material (typically, stainless steel) has been traditionally adopted to the Coriolis mass flow meter. Japanese Unexamined Utility Model Publication No. S64-15921 (Japanese Utility Model Application No. S62-107307) proposes a vibration tube formed by arranging a tube of a synthetic resin, such as a fluorine resin as a material having excellent corrosion proof properties, on the inner periphery of a metal tube in order to pave the way for application of the Coriolis mass flow meter to medical agents which are acid, alkaline and the like.

Further, Japanese Translation of PCT Publication No. H11-510608 discloses constituting a vibration tube of a plastic material having excellent corrosion proof properties, and cites as examples thereof polytetrafluoroethylene (PAFE), a tetrafluoroalkoxy polymer (PFA), and polyether ether ketone (PEEK).

SUMMARY OF THE INVENTION

In a case of installing a Coriolis mass flow meter onto a wall, in a conventional manner, external vibration isolating rubber is typically interposed therebetween. Vibration isolating rubber with a variety of vibration isolating properties are available, and adopting the vibration isolating rubber with vibration isolating properties that conform to an environment in which the Coriolis mass flow meter is installed can suppress entry of a vibration from the wall. However, as also pointed out in Japanese Unexamined Patent Publication No. 2003-207380, in the case of adopting the Coriolis mass flow meter to a fluid with a minute flow rate, it is necessary to take measures for further suppressing an influence of a vibration from the outside as the disturbance element. In application of the Coriolis mass flow meter to the fluid with a minute flow rate, needless to say, reduction in size of the Coriolis mass flow meter is added to items of requests from the user.

An object of the present invention is to provide a Coriolis mass flow meter capable of reducing an influence due to an external vibration.

A further object of the present invention is to provide a Coriolis mass flow meter capable of having a function to reduce an influence of a vibration transmitting from a wall surface when the Coriolis mass flow meter is installed onto the wall surface.

A still further object of the present invention is to provide a Coriolis mass flow meter having an ability to reduce by itself an influence of a vibration from the outside, thereby to improve the accuracy in detection of a mass flow rate of a fluid with a minute flow rate, aiming for reduction in size and weight.

A yet further object of the present invention is to provide a Coriolis mass flow meter, which supplies a vibration tube with a fluid to be measured, and has a function to reduce an influence of a vibration due to interposition of an external tube that accepts the fluid to be measured having left this vibration tube.

According to one aspect of the present invention, the technical problem is accomplished by providing a Coriolis mass flow meter, having:

a frame, which supports a pair of curved tube type vibration tubes, a vibration exciter to excite the pair of vibration tubes, and a detector to detect vibrating states of the pair of vibration tubes; and an outer case, which surrounds the frame, the meter being installable onto a wall surface by the outer case being fixed to the wall surface, wherein a clearance is provided between the outer case and the frame, and the outer case is engaged with the frame through a vibration isolating member.

According to another aspect of the present invention, the technical problem is accomplished by providing a Coriolis mass flow meter, having;

a main frame, which supports a pair of curved tube type vibration tubes;

a subframe, which extends from the main frame along a measurement portion of the vibration tube, and extends in a space between the pair of vibration tubes;

a vibration exciter, which is arranged on the subframe and excites the vibration tube;

a detector, which is arranged on the subframe and detects a vibrating state of the vibration tube; and an outer case, which is engaged with the main frame to surround the subframe, and is fixable to a wall surface, wherein a clearance is provided between the outer case and the main frame, and the outer case is engaged with the main frame through a vibration isolating member.

Specifically, according to the present invention, since the outer case is supported in a floating manner with respect to the frame through the vibration isolating member, a vibration having transmitted from the wall surface to the outer case can be blocked by the vibration isolating member from transmitting to the frame. Further, concerning the foregoing vibration leakage, transmission of a vibration between the frame and the outer case is blocked by the vibration isolating member interposed between the frame and the outer case, thereby facilitating adjustment of a zero point of a measured value.

According to a specific example of the present invention, the Coriolis mass flow meter has:

an arm, which extends from the main frame toward the depth of the subframe;

a first seat, which is provided at the end of the arm, and on which the vibration isolating member can be seated;

a window, which is formed in a portion of the outer case, corresponding to the first seat, and through which the vibration isolating member can be accessed; and a second window, which is formed in the outer case and located adjacently to the window, and on which the vibration isolating member can be seated, wherein the vibration isolating member is detachably fixed to the first and second seats in the state of its one end being seated on the first seat and its other end being seated on the second seat.

According to the specific example, since the vibration isolating member can be arranged in a position close to the center of gravity of the Coriolis mass flow meter, even a Coriolis mass flow meter in a simple shape can sufficiently block a vibration from the outside. Further, the Coriolis mass flow meter can be peeped from the outside through the window, thereby facilitating finding of irregularities, such as rupture, of the vibration isolating member and replacement of the vibration isolating member.

The vibration tube applied to the Coriolis mass flow meter of the present invention may be a tube made of metal such as stainless steel, or may be a tube made of a corrosion proof plastic material, especially a fluorine resin base plastic material, or may be a tube obtained by forming a layer made of the fluorine resin base plastic material on the inner periphery of the metal-made tube.

Further, the inlet portion and the outlet portion of the vibration tubes of the Coriolis mass flow meter of the present invention may be made of an elastic plastic material, and thereby, a vibration can be blocked from incoming through the external pipe at the inlet portion and the outlet portion made of the elastic plastic material.

BRIEF DESCRIPTION OF THE DRAWINGS

FIG. 9 is a view showing vibration tubes, which are a pair of vibration tubes being coupled independently to manifolds, for explaining that these two independent vibration tubes are applicable to the present invention;

DETAILED DESCRIPTION OF THE INVENTION

Figure 1:
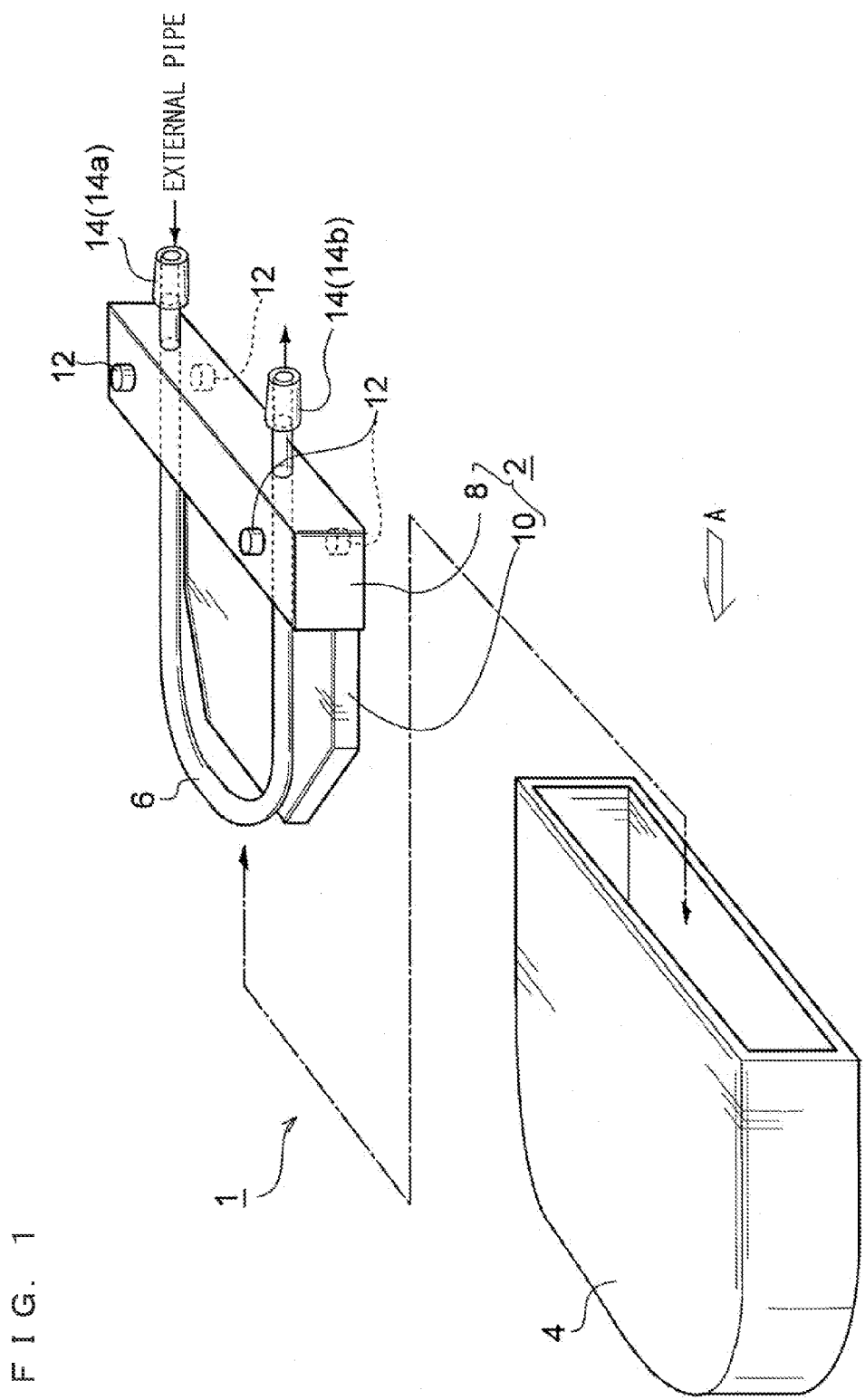
FIG. 1 is a view for explaining a basic configuration of the present invention.
Figure 2:
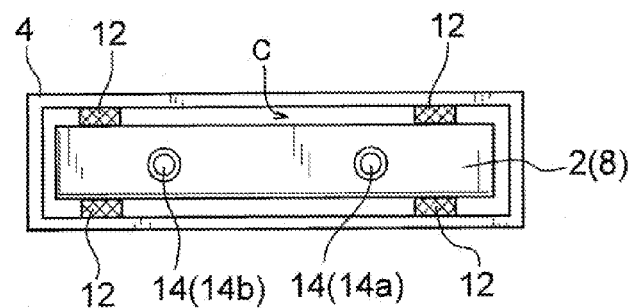
FIG. 2 is a view seen from a direction of an arrow A in FIG. 1.

Before description of a specific example in accordance with the present invention, a preferred embodiment of the present invention is described with reference to FIGS. 1 and 2. With reference to FIG. 1, a Coriolis mass flow meter 1 has a frame 2 and an outer case 4, and the frame 2 is installed with a vibration tube 6 as a component, and a vibration exciter and detectors which are not shown. The vibration tube 6 is a curved tube type, and its inlet 6a and outlet 6b are located on the same side. Specifically, the vibration tube 6 having a U-shape in a planer view is supported by the frame 2 at its both ends.

The frame 2 is arranged across the extremities of the vibration tube 6, and has: a support base, namely a main frame 8, that supports the vibration tube 6 in a cantilever state; and a subframe 10 that extends from the main frame 8 toward the central portion side in an axial line direction of the vibration tube 6, namely a portion side where the vibration tube 6 generates twist. The detectors and the vibration exciter (neither is shown) are arranged in this subframe 10. The above configuration of the frame 2 is merely an example, and its specific shape is arbitrary so long as it is possible to support the vibration tube 6 and support the detectors and the vibration exciter.

The outer case 4 that surrounds the frame 2, the vibration tube 6 and the like is engaged with the main frame 8 when described using this example, and this engagement is performed through the vibration isolating member 12. FIG. 2 is a view of the outer case 4 shown in FIG. 1, which is seen from a direction of an arrow A. As seen from this FIG. 2, a clearance C is provided between the main frame 8 and the outer case 4, and the vibration isolating members 12 made of a rubber material or the like are inserted and mounted between the main frame 8 and the outer case 4. Thereby, the outer case 4 is supported with respect to the frame 2 in a floating manner. When the Coriolis mass flow meter 1 is installed in a site, the outer case 4 is fixed to an arbitrary wall surface for the installation.

As described above, forming the floating support structure of the outer case 4 with respect to the frame 2 can block vibration transmission between the frame 2 and the outer case 4 by the vibration isolating members 12, so as to suppress variations in vibration state of the vibration tube 6 caused by a vibration having transmitted to the outer case 4. Although an external vibration isolating rubber may naturally be installed between the outer case 4 and the wall surface as has conventionally done, even when the Coriolis mass flow meter 1 is directly fixed to the wall surface without this external vibration isolating rubber, an influence due to an external vibration can be reduced by the floating support structure of the outer case 4. Further, as for the problem of the zero-point adjustment concerning the vibration leakage described above, vibration transmission has been blocked by the vibration isolating member 12 installed and mounted between the frame 2 and the outer case 4, thereby to facilitate the zero-point adjustment.

It is to be noted that, although the outer case 4 has the shape of an open ended box in the illustrated example, this box-shaped outer case 4 may be divided into upper and lower halves so that the two box halves constitute the outer case 4.

Further, for example, an outer peripheral wall continuous along the outer peripheral edge of the subframe 10 may be provided, the outer case 4 may be constituted of a plate material, the clearance C may be set with respect to the external wall of the subframe 10 and the main frame 8, and the outer case 4 made of the plate material may be attached to the main frame 8 with the vibration isolating members 12 interposed therebetween. Also in this case, the Coriolis mass flow meter 1 is fixed to the wall face through the outer case 4 made of the plate material.

Vibrations from the outside include not only vibrations from the wall surface, but also vibrations transmitting from the external pipes, coupled to the inlet 6a and the outlet 6b of the vibration tube 6, to the vibration tube 6. When the vibration tube 6 is sectioned into a measurement portion where a phase difference of vibrations in the vibration exciter and the detectors are measured and a supply/discharge portion where a fluid is accepted from the external pipe on the opposite side to the measurement portion or is discharged to the external pipe, with the frame portion that supports the vibration tube 6, namely the main frame 8 when described by the example of FIG. 1, interposed therebetween, it would be better that the whole or part of an inlet portion 14a and an outlet portion 14b as the supply/discharge portion of the vibration tube 6 is made up of a tube 14 made of an elastic plastic material (typically, fluorine resin material).

Thereby, a vibration of the external pipe can be blocked by the elastic tube 14 (typically, fluorine resin tube) arranged in the supply/discharge portion of the vibration tube 6. Although a Coriolis mass flow meter with a manifold interposed between the vibration tube 6 and the external pipe is known, the tube 14 made of the elastic plastic material may be interposed between the supply/discharge portion of the vibration tube 6 and the manifold.

Although the effect of blocking a vibration from the outside through the external pipe by the elastic tube 14 is effective when the vibration tube 6 is made up of a tube made of metal such as stainless steel, it is also effective in the case of constituting the vibration tube 6 of a material having excellent corrosion proof properties, such as the fluorine resin base material, and in the case of constituting the vibration tube 6 of this corrosion proof synthetic resin material with its outer periphery reinforced, and also effective on a metal-made tube with its inner peripheral surface made of a corrosion synthetic resin (typically, fluorine resin) material, and the like.

Especially, as for the vibration tube 6 made of a synthetic resin material, reinforcing with a carbon fiber or the like a vibrating portion from a portion fixed to the frame 2 to the vibration exciter, namely the measurement portion, can lead to the reinforced portion providing sufficient rigidity as the vibration tube 6. In addition to this, not performing the foregoing reinforcement on a connecting portion from the portion fixed to the frame 2 to the external pipe as regarding this portion as a non-reinforced portion can block transmission of a vibration from the external pipe to the reinforced portion, namely the measurement portion of the vibration tube 6 by non-reinforced portion. Naturally, constituting the material for the vibration tube 6 primarily of the synthetic resin material can contribute to reduction in weight of the Coriolis mass flow meter. Further, selecting the fluorine resin base material as the synthetic resin material and forming a fiber reinforced layer on its outer peripheral side facilitates coupling of the frame with the vibration exciter and the detectors, so as to facilitate realization of reduction in size and weight of the Coriolis mass flow meter.

Figure 3:
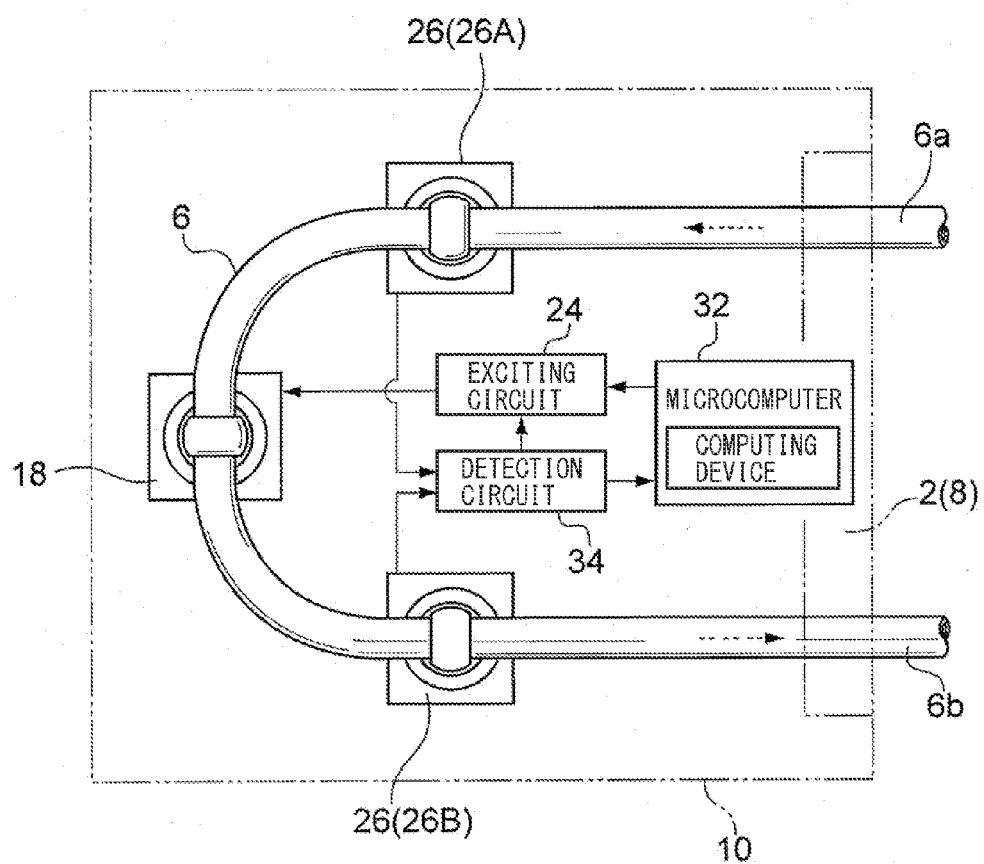
FIG. 3 is a view for explaining constitutional elements associated with an operation of a Coriolis mass flow meter of the present invention.
Figure 4:
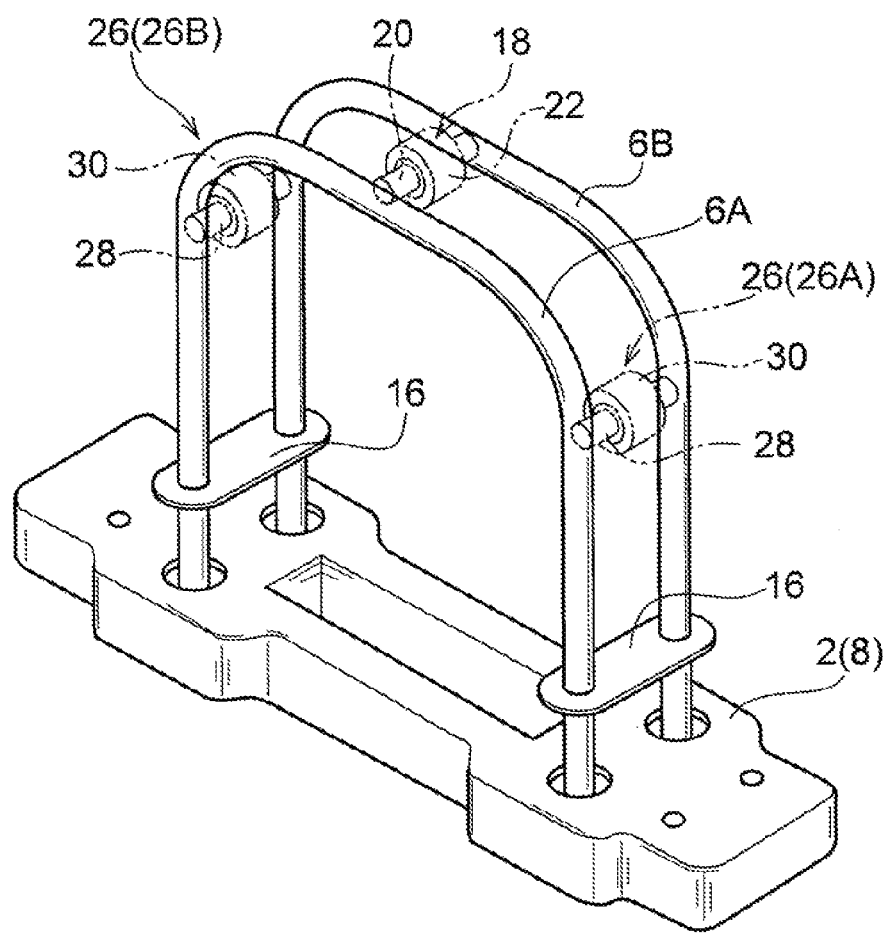
FIG. 4 is a view for explaining a pair of vibration tubes arranged in parallel with each other, a vibration exciter that excites the tubes, and detectors that detect the vibrating states of the vibration tubes.

Next, examples of the present invention are described with reference to FIG. 3 and thereafter. FIGS. 3 and 4 are views for explaining a structure and a principle of a Coriolis mass flow meter. A vibration tube 6 is made up of a curved tube with its inlet 6a and outlet 6b located on the same side, and a typical example thereof is a U-shaped tube having a U-shape in a planar view.

The U-shaped vibration tube 6 is supported in a cantilever state by the frame 2 (main frame 8). The left side and the right side of the vibration tube 6 in FIG. 3 are respectively the foregoing "measurement portion" and "supply/discharge portion", with the main frame 8 interposed therebetween. FIG. 4 is a view showing the measurement portion of the vibration tube 6. The vibration tube 6 is configured by a pair of vibration tubes 6A, 6B, arranged in parallel with each other, and a subframe 10 extends in a space sandwiched between the pair of vibration tubes 6A, 6B. The extremities, namely portions adjacent to the main frame 8, of the first and second vibration tubes 6A, 6B are coupled with each other through insulating plates 16, and these insulating plates 16 form nodes of vibrations of the first and second vibration tubes 6A, 6B.

A vibration exciter 18 is arranged at the central portion in an axial-line direction of the U-shaped measurement portion. This vibration exciter 18 is made up of a permanent magnet 20 and a coil 22 for electromagnetic drive (FIG. 4), and the permanent magnet 20 is arranged on each of the first and second vibration tubes 6A, 6B. Meanwhile, the coil 22 for electromagnetic drive is arranged on the frame 2, more specifically on the subframe 10, and allowing an alternating current to flow through the coil 22 for electromagnetic drive via an exciting circuit 24 can vibrate the vibration tube 6. A vibration is most preferably generated so as to vibrate the pair of vibration tubes 6A, 6B with a fixed number of vibrations.

As seen from FIGS. 3 and 4, detectors 26 are respectively arranged in the upstream portion and the downstream portion of the measurement portion of the vibration tube 6 with the vibration exciter 18 sandwiched therebetween. In the following description, the detector 26 arranged in the upstream portion is referred to as a first detector 26A and the detector 26 arranged in the downstream portion is referred to as a second detector 26B, as needed.

Each of the detectors 26 is made up of a known electromagnetic pickup, and configured by an element 28 to be detected, made of a permanent magnet, and a coil 30 (FIG. 4). The elements 28 to be detected are arranged on the first and second vibration tubes 6A, 6B, while the coil 30 is arranged on the frame 2, more specifically the subframe 10. The element 28 to be detected reciprocates inside the coil 30 accompanied by vibrations of the vibration tubes 6A, 6B, so that the vibrating states, specifically vibration velocities, of the respective vibration tubes 6A, 6B are detected by the detector 26.

The element 28 to be detected may be a magnetic material such as silicon steel as disclosed in Japanese Unexamined Patent Publication No. 2003-207380 above. Japanese Unexamined Patent Publication No. 2003-207380 proposes fixing a permanent magnetic that magnetizes the magnetic material to a frame, and arranging a coil on this frame.

As would be understood by one skilled in the art from the above description, the subframe 10 is provided with openings (not shown in the drawing by reason of creating the drawing) penetrating the subframe 10 in portions where the vibration exciter 18 and the first and second detectors 26A, 26B are arranged, and at these openings, the coils 22, 30 are formed.

When a fluid flows through the vibration tube 6, a Coriolis force is generated which is proportional to its mass and velocity and an angular velocity in excitation, and the direction of this Coriolis force agrees with a product of the movement direction (velocity vector) of the fluid and a vector of the angular velocity in excitation of the vibration tube 6. Further, on the inlet side and the outlet side of the fluid in the vibration tube 6, the flowing directions of the fluid are opposite to each other. This causes generation of twist torque in the vibration tube 6 due to the Coriolis force. This torque changes at the same frequency as an excitation frequency, and its amplitude value and a mass flow rate of the fluid have a predetermined relation.

Although distortion of the vibration tube 6 due to a vibration generated by the vibration tube 6 with the vibration exciter 18 and the twist of the vibration tube 6 due to the Coriolis force are superimposed on each other, a computing device 32 including a microcomputer computes a mass of the fluid to be measured which passes through the vibration tubes 6 based upon a phase of an amplitude of the twist, namely the respective vibrating states detected in the respective detectors 26A, 26B and the detection circuit 34, that is, a phase difference in velocity signal among vibrations in the respective positions.

First Example (FIGS. 5 to 13)

Figure 5:
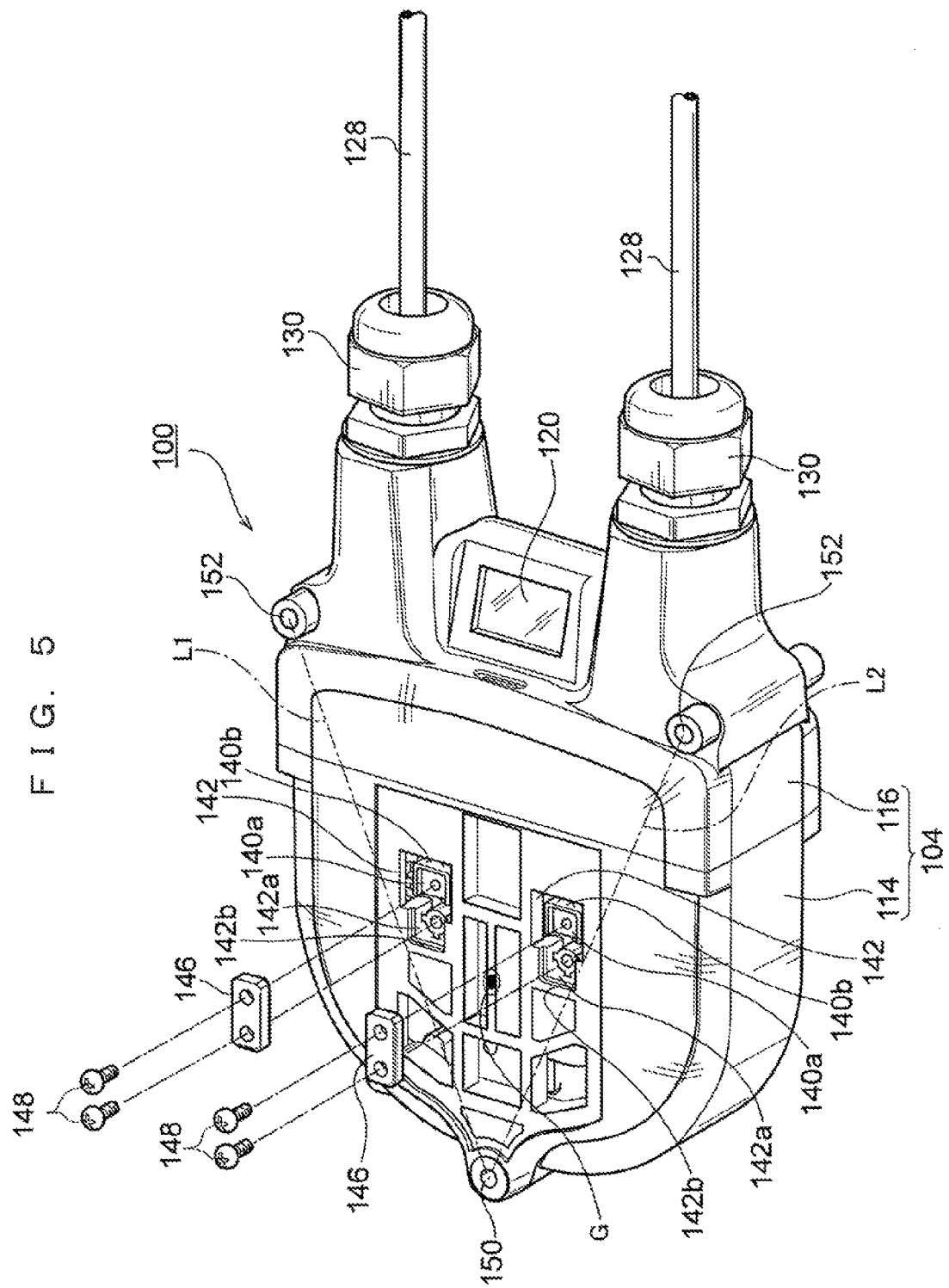
FIG. 5 is a perspective view of a dual tube type Coriolis mass flow meter of a first example.
Figure 6:
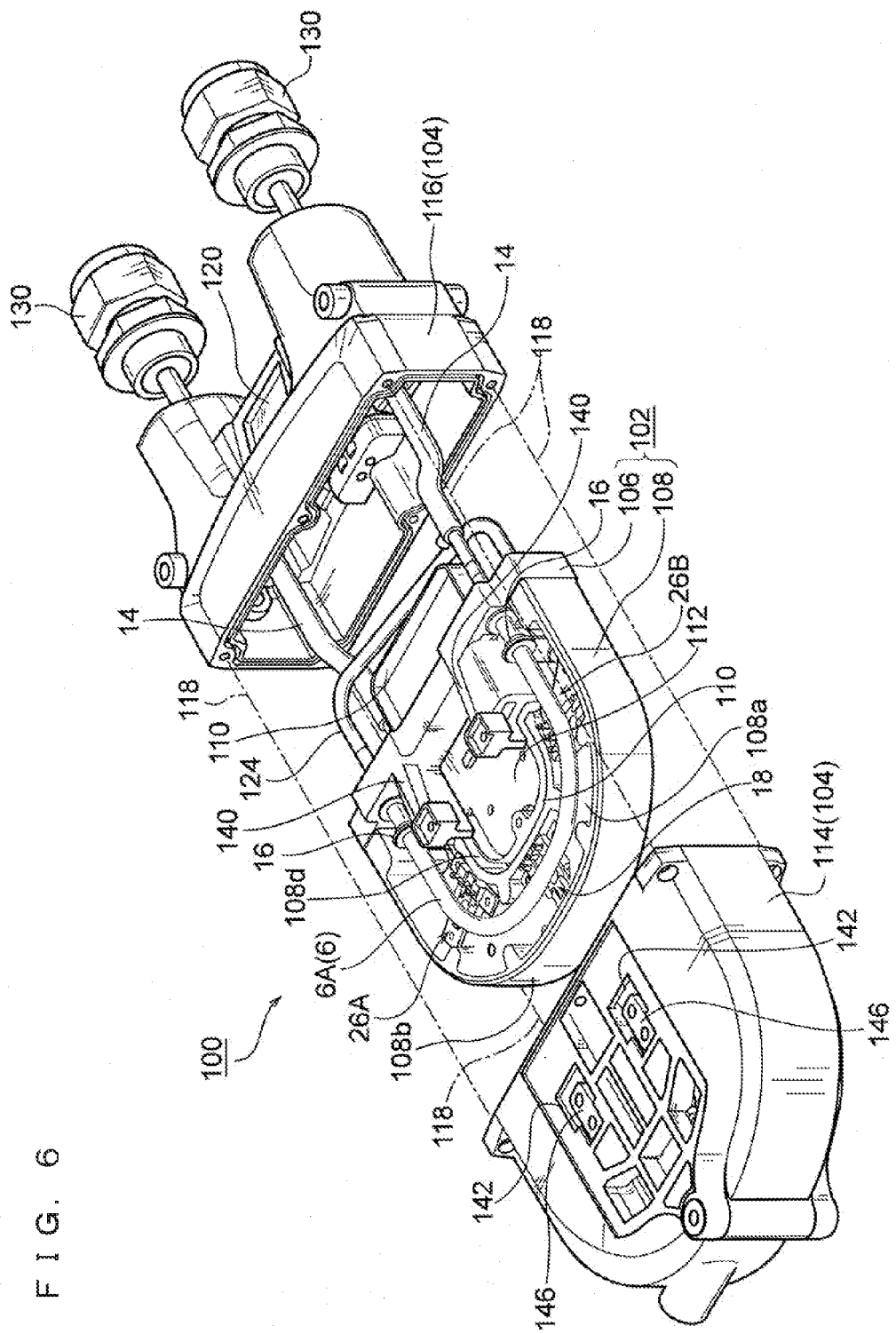
FIG. 6 is an exploded perspective view of the dual tube type Coriolis mass flow meter of FIG. 5.

FIG. 5 is a perspective view of a dual tube type Coriolis mass flow meter 100 of a first example, and FIG. 6 is an assembled exploded view thereof. The Coriolis mass flow meter 100 is schematically configured by a frame 102 and an outer case 104 surrounding this frame.

With reference to FIG. 6, although the vibration tube 6 is configured by the two vibration tubes 6A, 6B which are arranged in parallel with each other as described above, the one vibration tube 6B is not shown in FIG. 6 by reason of creating the drawing. In the following description, referential numeral "6" is provided as a generic numeral for the two vibration tubes 6A, 6B. The frame 102 is made up of a support base, namely a main frame 106 which supports the vibration tube 6 in a cantilever state, and a subframe 108 which supports. the vibration exciter 18 and the first and second detectors 26A, 26B. The main frame 106 and the subframe 108 are separately structured. The main frame 106 is made up of a plastic molded product, and the subframe 108 is made up of a cast made of light metal, specifically an aluminum alloy. This subframe 108 is fastened with bolts to the main frame 106.

Figure 7:
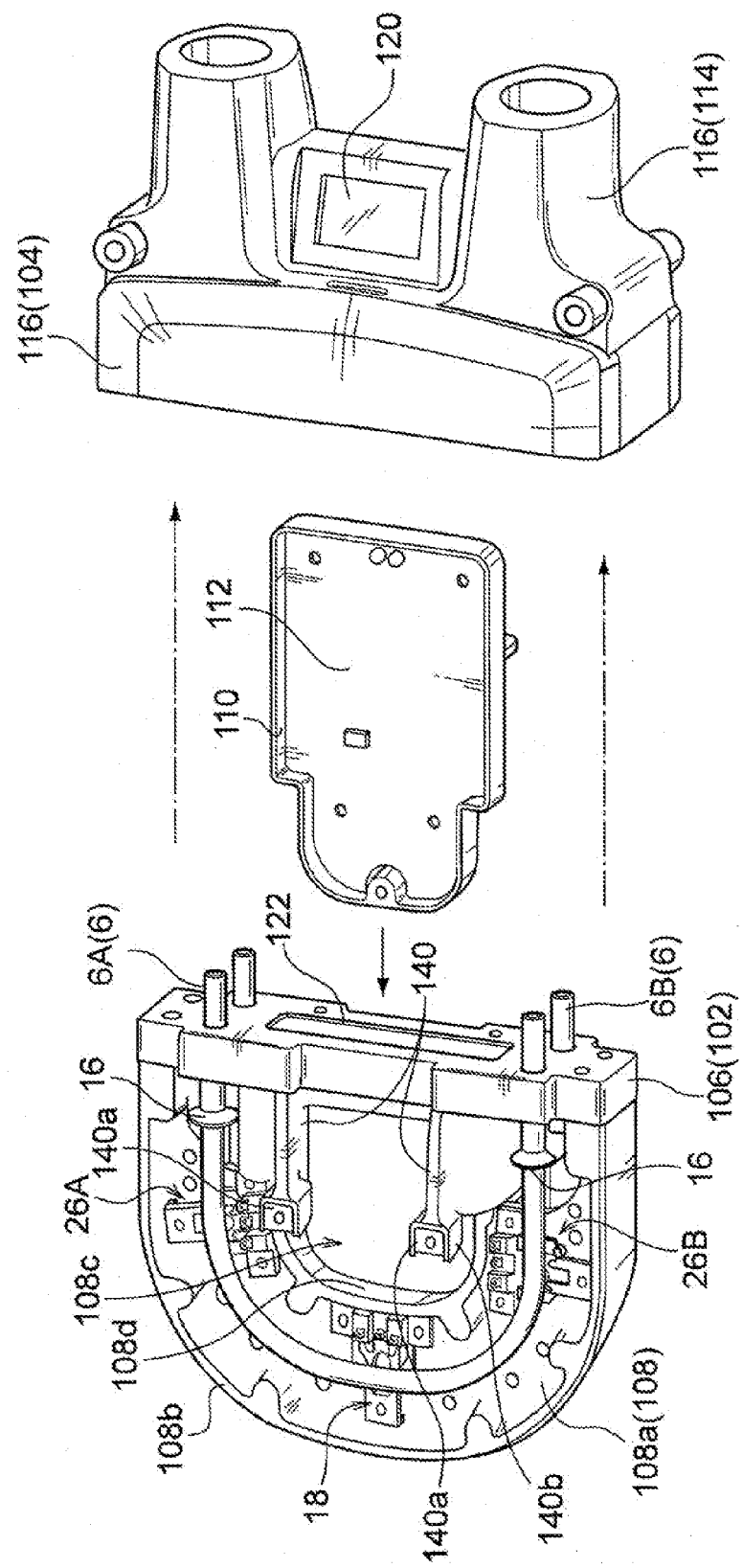
FIG. 7 is a view for explaining a board case to be inserted through an opening of a main frame.

The subframe 108 has a subframe body 108a which is relatively thin and has an outline having an almost similar shape to that of the measurement portion of the vibration tube 6 having a U-shape in a planar view, and an outer peripheral wall 108b which is formed on the outer periphery of this subframe body 108a. The outer peripheral wall 108b has almost the same height size as that of the main frame 106. Inside the measurement portion of the U-shaped vibration tube 6, the subframe 108 has a notch 108c in almost similar shape to that of the measurement portion of the vibration tube 6 (FIG. 7). An inner peripheral wall 108d is formed at the U-shaped inner peripheral edge which defines the notch 108c continuously along the notch 108c, and has a smaller height size than that of the outer peripheral wall 108b. As thus described, providing the outer peripheral wall 108b and the inner peripheral wall 108d at the outer peripheral edge and the inner peripheral edge of the subframe body 108a can ensure the rigidity of the subframe 108 while reducing the weight thereof. The body 108a of the subframe 108 is located between the pair of vibration tubes 6. Further, since the vibration exciter 18 and the first and second detectors 26A, 26B that are mounted on the subframe 108 are arranged between the outer peripheral wall 108b and the inner peripheral wall 108d, openings (not shown) through which the elements extending between the first and second vibration tubes 6A, 6B can be inserted are formed in places where the vibration exciter 18 and the first and second detectors 26A, 26B are arranged.

In the portion of the notch 108c defined by the inner peripheral wall 108d of the subframe 108, a board case 110, which is described later, is arranged (FIG. 7) and a circuit board 112 housed in this board case 110 is positioned adjacently to the measurement portion of the vibration tube 6. Naturally, the clearance is provided between the board case 110 and the inner peripheral wall 108d of the subframe 108 so as not to interfere with each other.

The outer case 104 is configured by a first outer 114 covering the measurement portion of the vibration tube 6, and a second outer 116 covering the supply/discharge portion of the vibration tube 6, and the first and second outers 114, 116 are unified by being fastened with combinations 118 of bolts and nuts.

As best seen from FIG. 5, in the second outer 116 covering the supply/discharge portion of the vibration tube 6, a window 120 for monitoring is formed, through which a display monitor can be looked at from the outside.

The foregoing board case 110 is tightly engaged into an opening 122 (FIG. 7) penetrating the inside and the outside of the main frame 106 that supports the vibration tube 6 in a cantilever state, and then fixed with a screw (not shown). A circuit board 112 to be housed into the board case 110 penetrates the opening 122 of the main frame 106 and continuously extends. On this circuit board 112, in a portion corresponding to the measurement portion of the vibration tube 6, the foregoing exciting circuit 24, computing circuit 32, and detection circuit 34 are formed, and on the other hand, in a portion corresponding to the supply/discharge portion of the vibration tube 6, a liquid crystal monitor (not shown) and a monitor driving circuit that drives this liquid crystal monitor are formed.

As would be immediately understood by one skilled in the art, providing one circuit board 112 extending through the main frame 106 can shorten the wires electrically coupling the vibration exciter 18 and the first and second detectors 26A, 26B with the circuit board 112, and can also shorten the wire electrically connecting the liquid crystal motor with the circuit board 112. Incidentally, although not shown in the figure, the liquid crystal display monitor that is positioned facing the window 120 for monitoring is mounted on the circuit board 112. Naturally, the end of the supply/discharge portion of the vibration tube 6 is connected with a cable (not shown), and is communicated with an external instrument and a power source through this cable.

Figure 8:
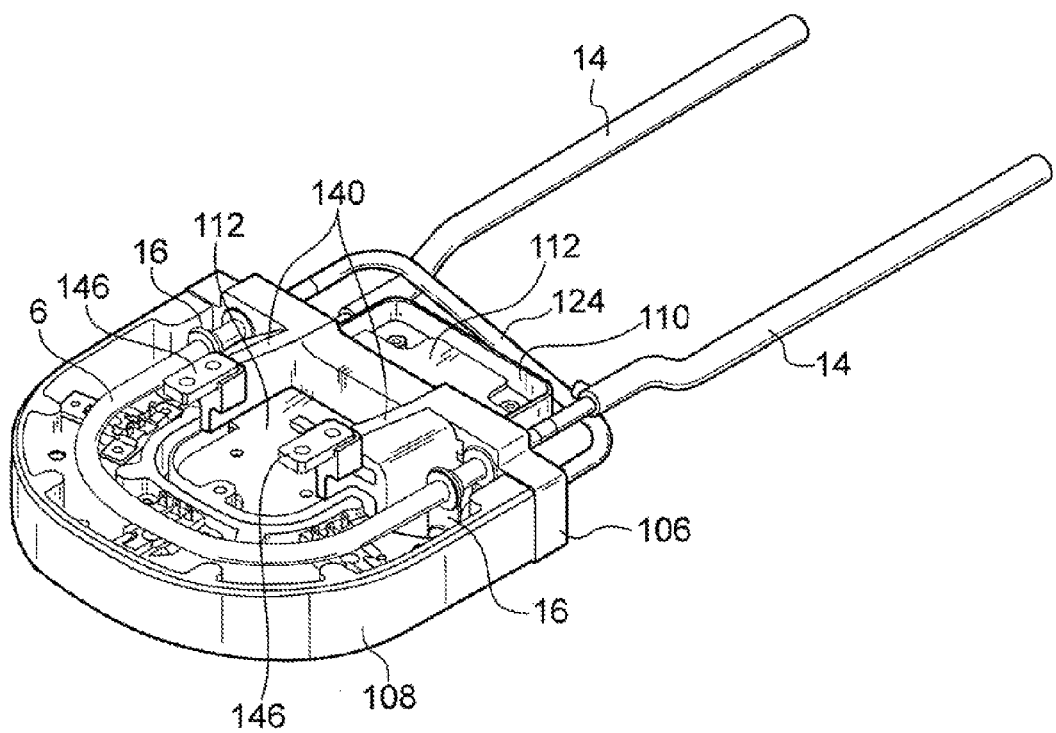
FIG. 8 is a view showing loop type vibration tubes, which are a pair of vibration tubes being coupled with each other through a communication tube, for explaining that these loop type vibration tubes are applicable to the present invention.

FIG. 8 shows an assembly in which the vibration tube and the board case 110 are incorporated into the frame 102. As seen from FIG. 8, the supply/discharge portions of the pair of vibration tubes 6 are coupled with each other through one communication tube 124, and thereby, the pair of vibration tubes 6 constitutes the loop type vibration tube. FIG. 9 shows a modified example, and as seen from FIG. 9, the two vibration tubes 6 are individually independently coupled to manifolds 126.

Each of the pair of vibration tubes 6 may be a tube made of metal, or may be a tube made of the foregoing corrosion proof plastic. Further, each of the pair of vibration tubes 6 may be a tube being this tube of corrosion proof plastic with its measurement portion reinforced. With reference to FIG. 6, a pair of connecters 130 coupling external pipes 128 to the vibration tube 6 is mountable on the second outer 116, and an elastic tube 14 is inserted and mounted between the connector 130 and the vibration tube 6. A vibration from the outer pipe can be blocked by this elastic tube 14. It should be noted that in the case of the manifold 126 being provided as in the example of FIG. 9, the elastic tube 14 may be arranged between the manifold 126 and the vibration tube 6.

The frame 102 has a left-and-right pair of arms 140 extending from the support base, namely the main frame 106, toward the depth of the subframe 108. The arms 140 extend along the inner peripheral wall 108d of the subframe 108, and are substantially united with this inner peripheral wall 108d. Although the left-and-right pair of arms 140, 140 is shown on the upper side of the subframe 108 in FIG. 6 and the like, a left-and-right pair of arms is also provided on the lower side of the subframe 108, which are not shown on the drawing by reason of creating the drawing. The subframe 108 is formed with a total of four arms 140 extending toward the depth, namely the depth where relatively heavy loads such as the vibration exciter 18 and the first and second detectors 26A, 26B are arranged.

A first rectangular seat 140a having a horizontal surface is formed at the tip of each of the arms 140, namely the end thereof which is the opposite side to the main frame 106, and the three sides of this rectangular seat 140a are defined by a longitudinal wall 140b. More specifically, the longitudinal wall 140b is formed on the three sides of the arm 140, excluding the end portion of the arm 140 toward the front. In other words, the first rectangular seat 140a is open toward the front of the arms 140, namely the depth of the subframe 108.

On the upper and lower surfaces of the subframe 108, namely the first outer 114 surrounding the measurement portion of the vibration tube 6, windows 142 are formed in portions corresponding to the first rectangular seats 140a of the respective arms 140 of the frame 102, and through these windows 142, the first rectangular seats 140a of the arms 140 can be accessed.

The first outer 114 is formed with the second rectangular seat 142a stretching to the window 142. This second rectangular seat 142a is made up of a horizontal surface, and both sides of the second rectangular seat 142a and its side opposite to the first rectangular seat 140a are defined by a longitudinal wall 142b. In other words, the second rectangular seat 142a of the first outer 114 is open toward the first rectangular seat 140a.

The second rectangular seat 142a of the first outer 114 is positioned on a lower level than the top and the bottom surfaces of the first outer 114, and this second rectangular seat 142a is on the same height level as the first rectangular seat 140a of the arm 140. Further, a clearance C is provided between the second rectangular seat 142a and the first rectangular seat 140a. In a housing space having a rectangular shape in a planar view, which is defined by the respective longitudinal walls 140b, 142b of the first and second rectangular seats 140a, 142a, a vibration isolating member is arranged in the first and second rectangular seats 140a, 142a which is made of a flat rubber piece having a rectangular shape in a planar view, complementary to the housing space. This vibration isolating member 146 is fixed with bolts 148 (FIGS. 3, 10) in the state of its end being seated on the first and second rectangular seats 140a, 142a.

While the frame 102 is surrounded by the first and second outers 114, 116, the clearance C is provided between the frame 102 and the first and second outers 114, 116, and the first and second outers 114, 116 are thus coupled with the frame 102 only through the rubber pieces, namely vibration isolating members 146.

The Coriolis mass flow meter 100 is fixed to a wall surface (not shown) with bolts insertable into one first bolt through hole 150 on the top of the first outer 114 and two, a left-and right pair of, second bolt through holes 152 on the bases of the second outer 116, and with nuts to be screwed onto the bolts.

As thus described, the Coriolis mass flow meter 100 of the first example is provided with the clearance C between the outer case 104 that is fixed to the wall surface and the frame 102 that is housed into this outer case 104, and the outer case 104 and the frame 102 are coupled with each other through the vibration isolating members (flat rubber pieces having a rectangular shape in a planar view) 146. Hence, the frame 102 is supported by the outer case 104 in a floating manner, whereby a vibration having transmitted from the wall surface to the outer case 104 can be blocked by the vibration isolating member 146 from transmitting to the frame 102, and the transmission of the vibration from the frame 102 to the wall surface through the outer case 104 can also be blocked by the vibration isolating member 146.

Further, since the vibration isolating member 146 exposes to the outside through the window 142 of the outer case 104 and a replacement operation for the vibration isolating member 146 can thus be performed by access from the outside, not only that damage on the vibration isolating member 146 can be checked with eyes from the outside, but also the replacement operation for the vibration isolating member 146 can also be easily performed. That is, it is not necessary to take the frame 102 out of the outer case 104 for checking damage on the vibration isolating member 146, and further, it is possible to replace a damaged vibration isolating member 146 with a new vibration isolating member 146 without disassembling the outer case 104 and the frame 102.

Figure 10:
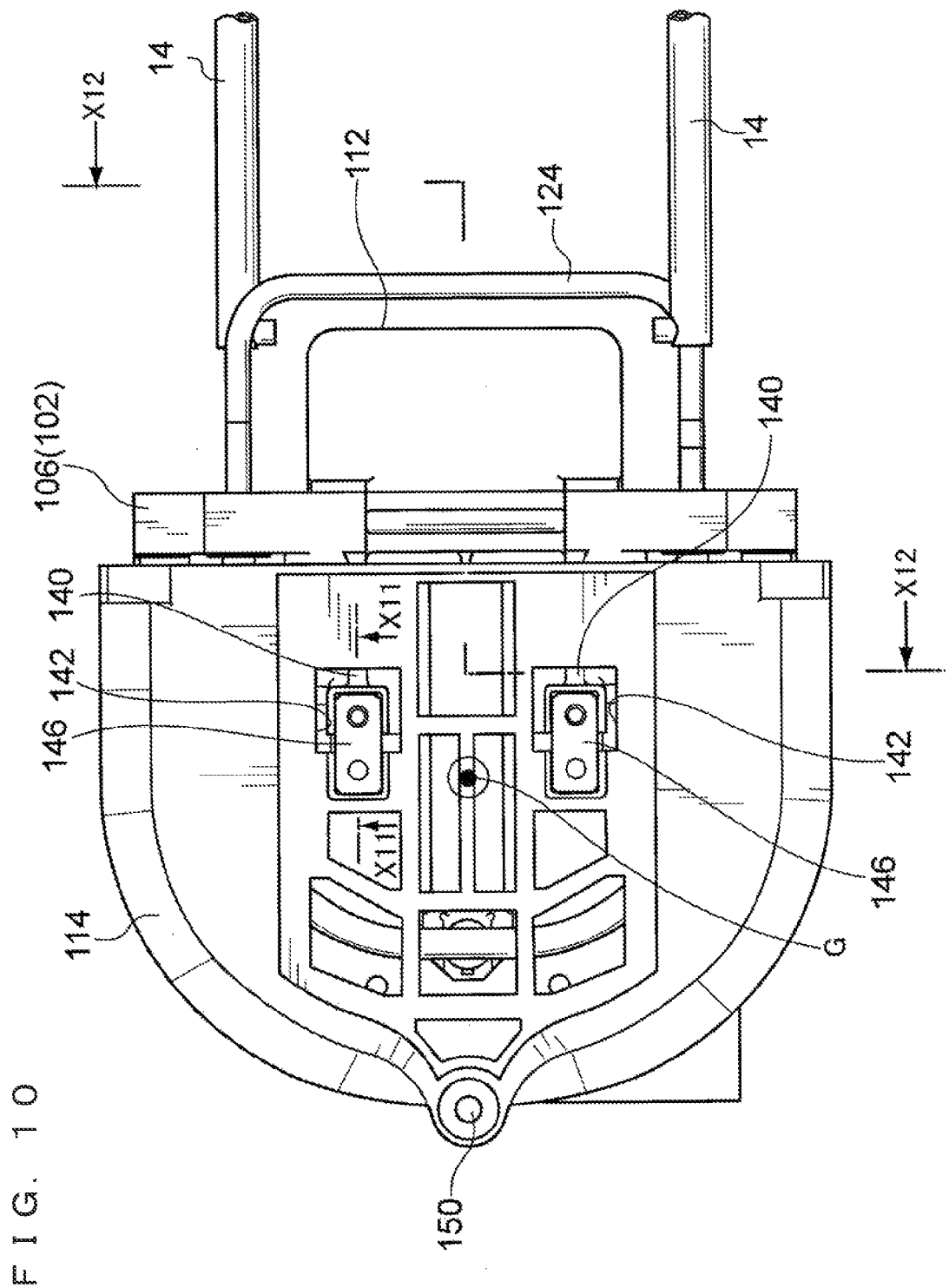
FIG. 10 is a plan view of a frame and an outer tube (first outer) surrounding the frame.
Figure 11:
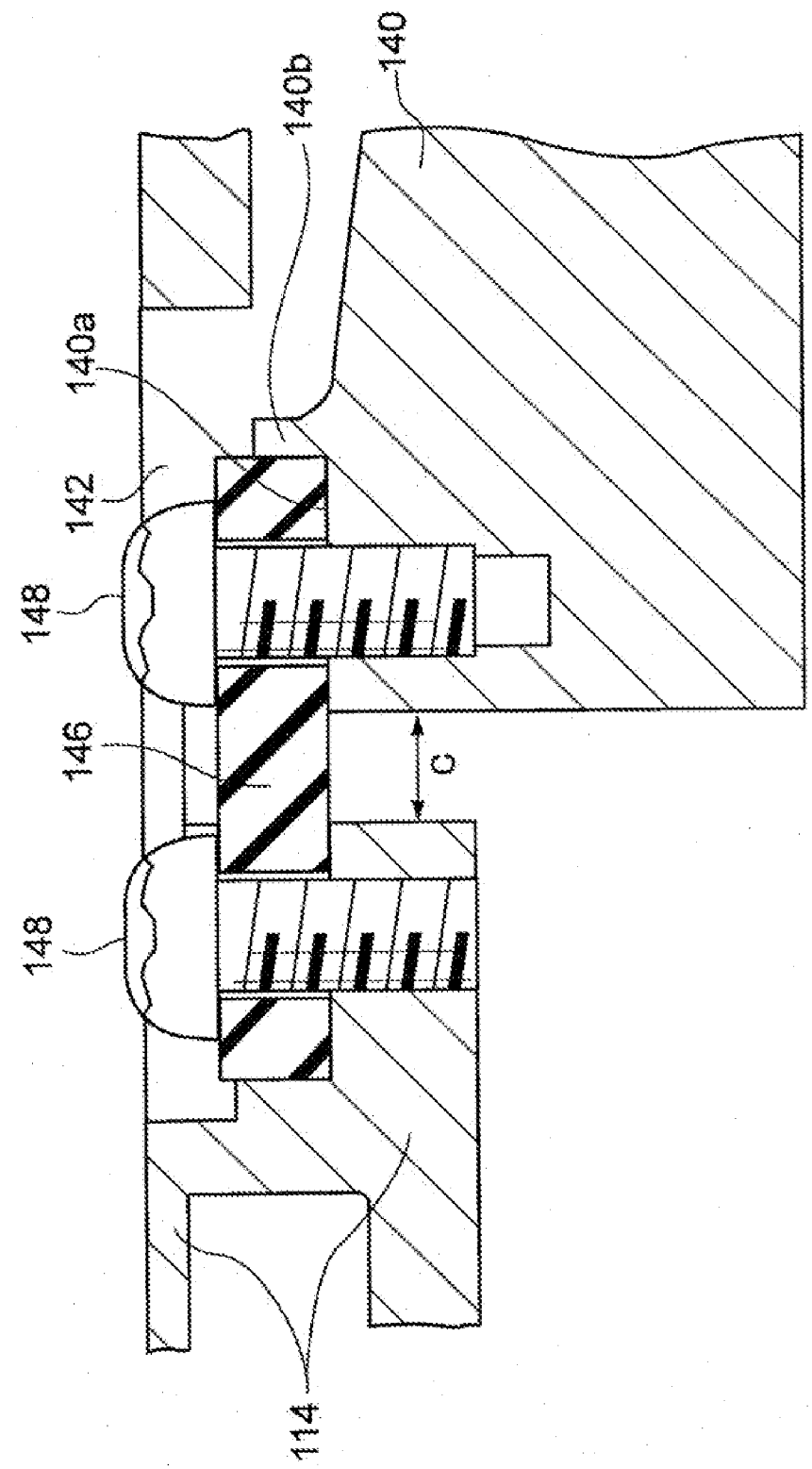
FIG. 11 is a cross-sectional view taken along line X11-X11 of FIG. 10.
Figure 12:
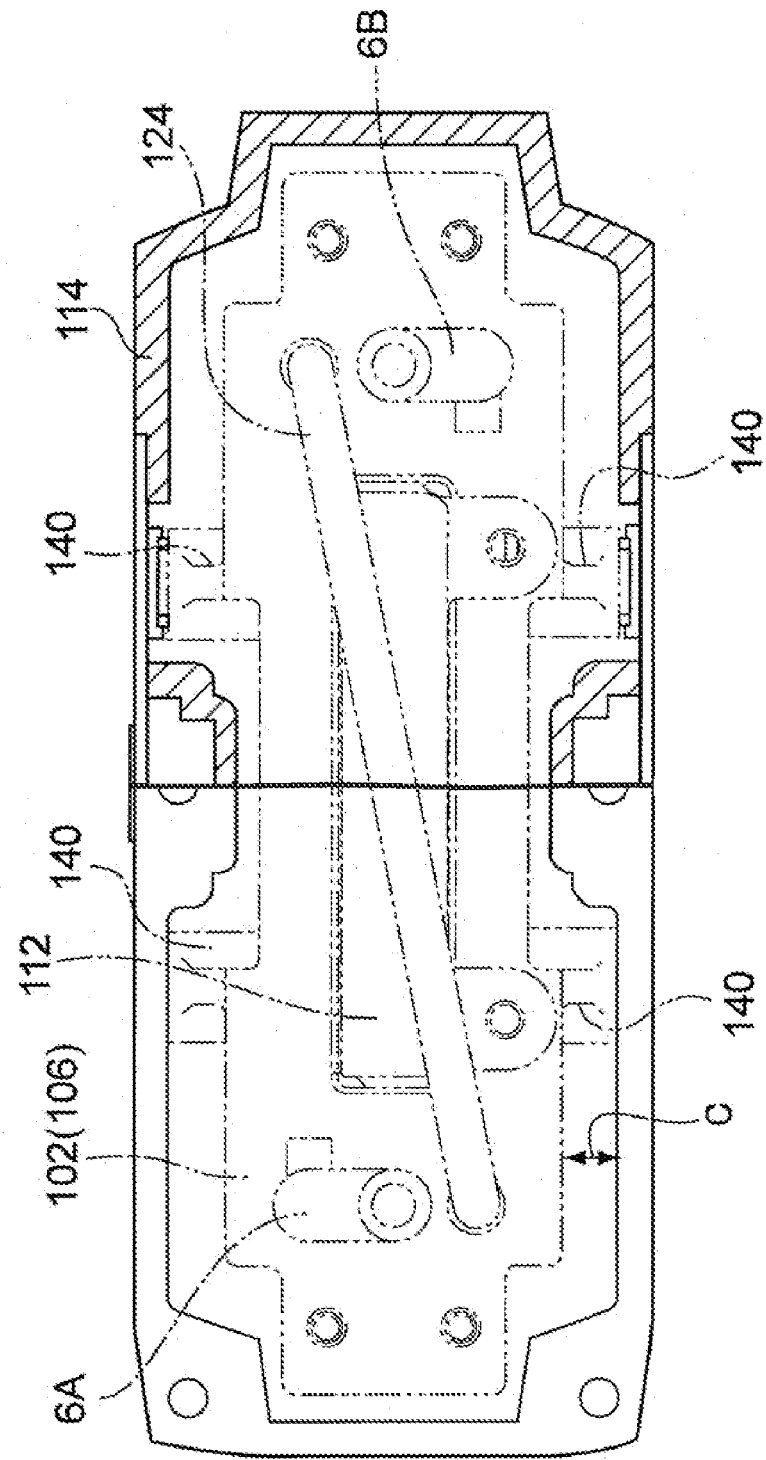
FIG. 12 is a cross-sectional view taken along line X12-X12 of FIG. 10.
Figure 13:
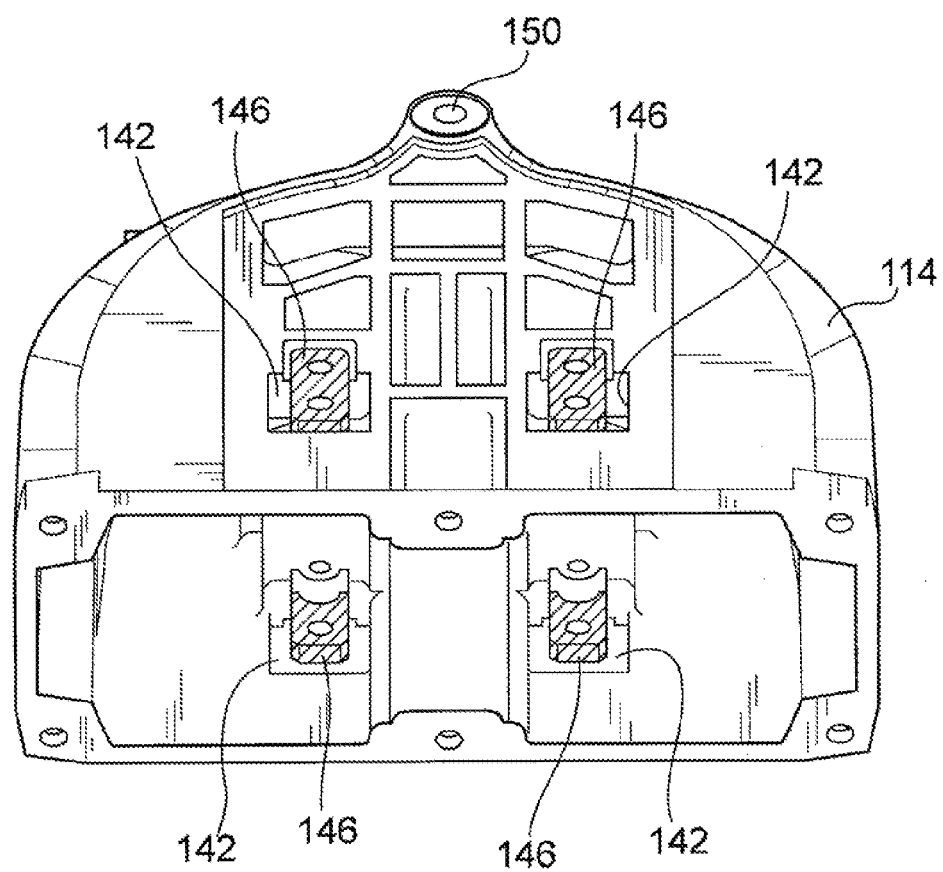
FIG. 13 is a view for explaining that a total of four rubber pieces as vibration isolating members are arranged, as well as a perspective view of the first outer in an outer case seen from the side of its opening.

Moreover, with the area for mounting the vibration isolating member 146 being set at the depth of the subframe 108 by means of the arm 140 extending from the frame 102 (main frame 106), the vibration isolating member 146 can be arranged at a position close to a gravity center G of the Coriolis mass flow meter 100 (FIGS. 5, 10). Furthermore, the vibration isolating members 146 are arranged in the vicinities of straight lines L1, L2 (FIG. 5) connecting the one first bolt through hole 150 and the two second bolt through holes 152, 152 for use in installment of the Coriolis mass flow meter 100 onto the wall surface with three sides thereof supported. Accordingly, as also shown in FIG. 13, the respective pairs of vibration isolating members 146 are arranged on a pair of surfaces of the outer case 104 (first outer 114) so that, by means of a total of four vibration isolating members 146, not only transmission of a vibration between the outer case 104 and the frame 102 can be blocked, but also the vibration isolating effect can be sufficiently exerted even when a vibration isolating member having a simple shape and structure, that is the rubber piece 146, is adopted as the vibration isolating member 146. The vibration isolating effects include adjustment of a zero point due to vibration leakage, in addition to an influence due to an external vibration.

Figure 14:
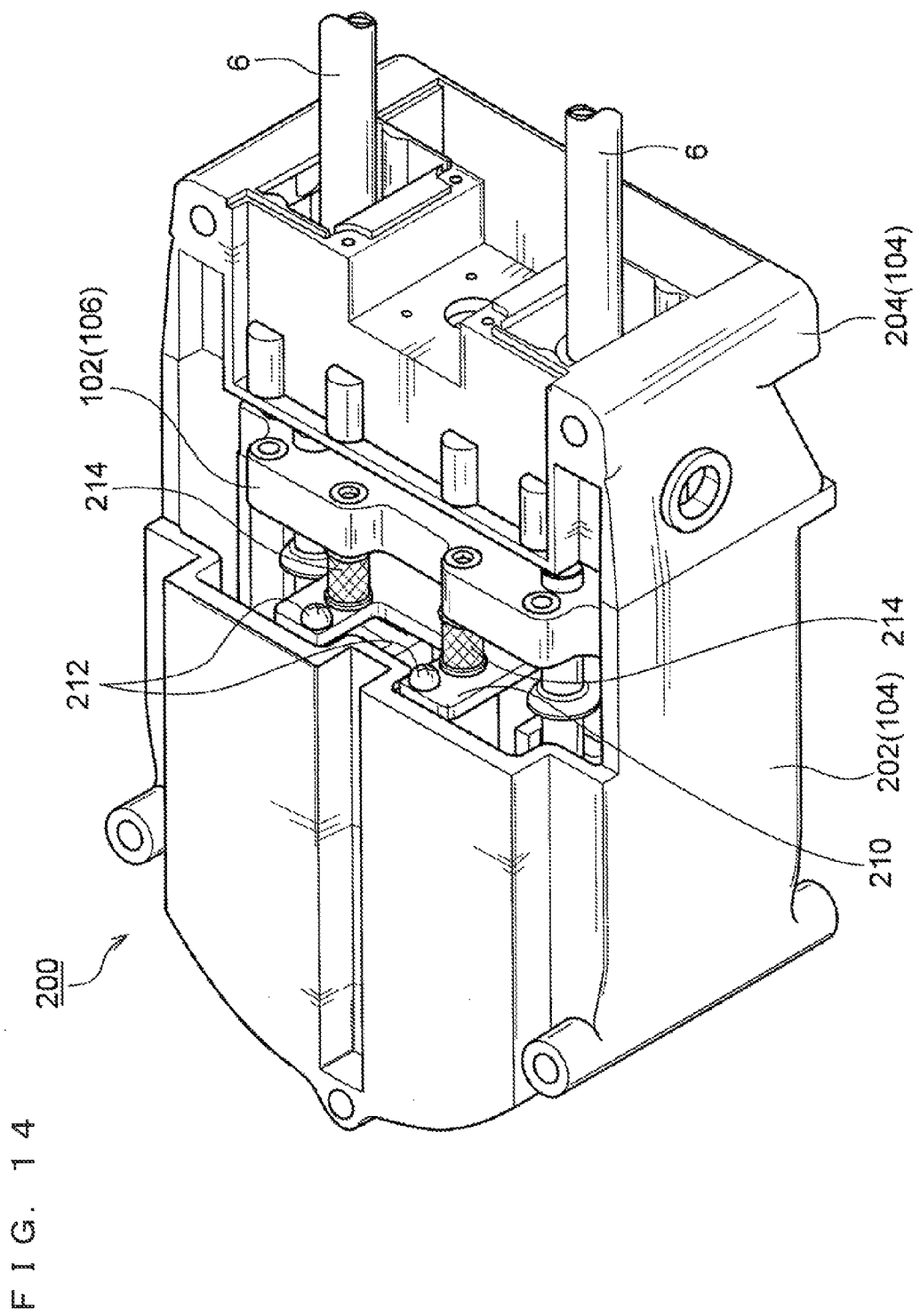
FIG. 14 is a perspective view of a Coriolis mass flow meter of a second example, with part of a plate-like outer removed from an outer case.
Figure 15:
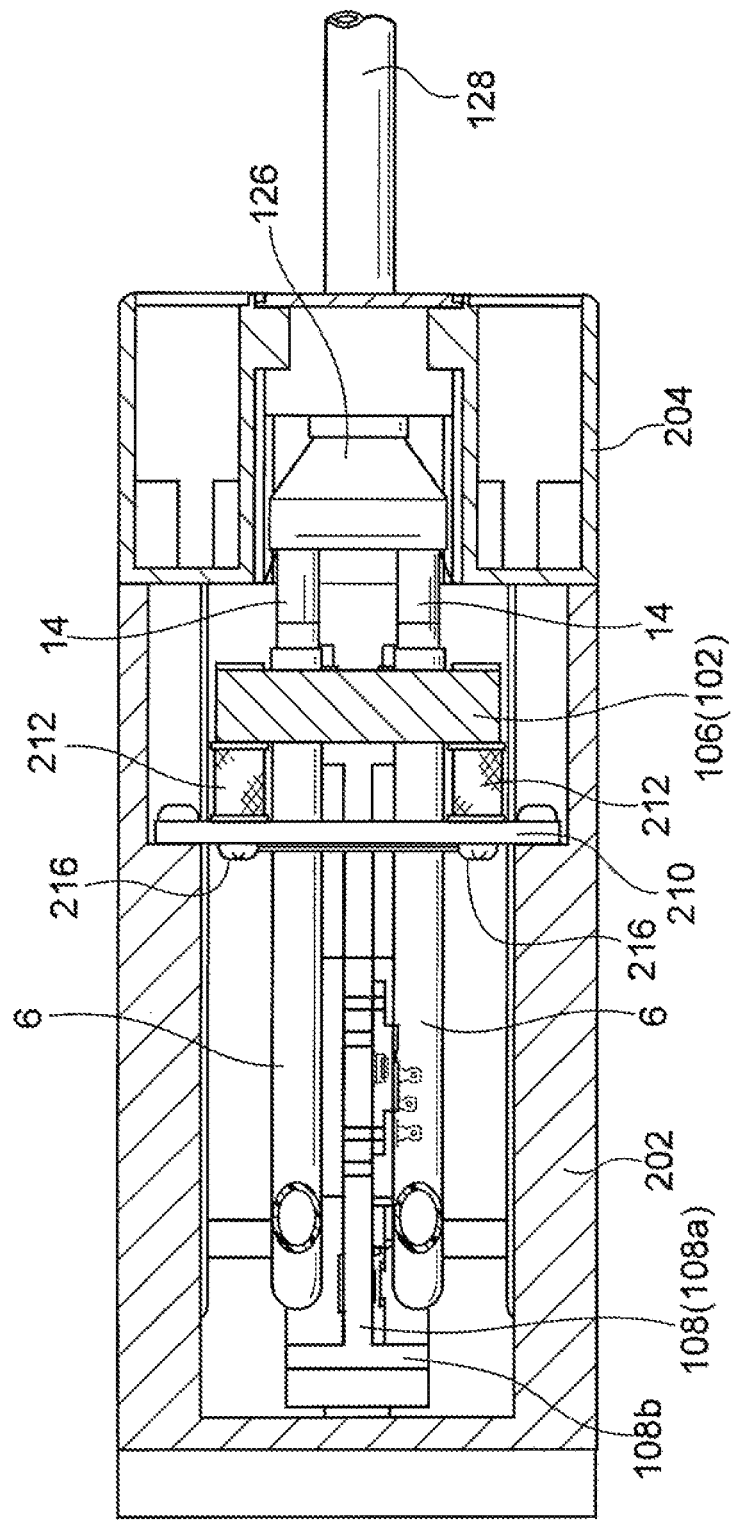
FIG. 15 is a longitudinal sectional view of the Coriolis mass flow meter of FIG. 14.

Second Example (FIGS. 14, 15)

FIGS. 14 and 15 show a Coriolis mass flow meter 200 of a second example. In a description of this Coriolis mass flow meter 200 of the second example, elements substantially the same as those of the first example described above are provided with the same referential numerals, and descriptions thereof are thus not given.

The Coriolis mass flow meter 200 of the second example is configured by a first outer 202 with the outer case 104 surrounding the subframe 108 (measurement portion of the vibration tube 6), a second outer 204 that surrounds the supply/discharge portion of the vibration tube 6, and besides, a plate-like third outer (not shown) that covers an open portion in FIG. 14.

A coupling plate 210 extending vertically in the notched portion is fixed to the first outer 202 with bolts 212, and vibration isolating members 214 are inserted and mounted between this coupling plate 210 and the main frame 106. The vibration isolating member 214 is made up of cylindrical rubber, and the cylindrical vibration isolating member 214 is located in parallel with the vibration tube 6. The cylindrical vibration isolating member 214 is freely fixed to a bolt 216 extending between the coupling plate 212 and the main frame 106.

This Coriolis mass flow meter 200 of the second example is assembled as follows. The vibration isolating members 214 and the coupling plate 210 are previously incorporated into the main frame 106 of the frame 102, and after insertion of this assembly into the first outer 202, the coupling plate 210 is fixed to the first outer 202 with the bolts 212. The notched portion of the first outer 202 is then covered by the third outer, thereby to bring the internal object of the Coriolis mass flow meter 200 into the state of being surrounded by the outer case 104.

In this Coriolis mass flow meter 200 of the second example, since the outer case 104 is supported in a floating manner by the frame 102 through the vibration isolating member 214 as in the first example, it is possible to block vibration transmission between the outer case 104 and the frame 102 by the vibration isolating member 214.

In this Coriolis mass flow meter 200 of the second example, when the vibration isolating member 214 becomes unable to exert its original vibration isolating function due to rapture or the like, the frame 102 can be taken out of the outer case 104 to replace the vibration isolating member 214.

Also in this Coriolis mass flow meter 200 of the second example, since the vibration isolating member 214 is arranged in a position close to the depth of the subframe 108 from the main frame 106, it is possible to block vibration transmission between the outer case 104 and the frame 102 by the vibration isolating member 214 relatively in cylindrical shape.

What is claimed is:

1. A Coriolis mass flow meter, comprising:
   a frame, which supports a pair of curved tube type vibration tubes, a vibration exciter to excite the pair of vibration tubes, and a detector to detect vibrating states of the pair of vibration tubes; and
   an outer case, which surrounds the frame,
   the meter being installable onto a wall surface by the outer case being fixed to the wall surface, wherein
   a clearance is provided between the outer case and the frame, and the outer case is engaged with the frame through a vibration isolating member
   wherein the pair of vibration tubes are composed of a fiber reinforced resin with respect to the vibration exciter and non-reinforced resin with respect to a connecting portion to the outer case.

2. The Coriolis mass flow meter according to claim 1, wherein at least the inner peripheral surface of the vibration tube is made of a plastic material having corrosion proof properties.

3. The Coriolis mass flow meter according to claim 1, wherein an inlet portion and an outlet portion of the vibration tube are made of an elastic plastic material.

4. A Coriolis mass flow meter, comprising:
   a main frame, which supports a pair of curved tube type vibration tubes;
   a subframe, which extends from the main frame along a measurement portion of the vibration tube, and extends in a space between the pair of vibration tubes;
   a vibration exciter, which is arranged on the subframe and excites the vibration tube;
   a detector, which is arranged on the subframe and detects a vibrating state of the vibration tube; and
   an outer case, which is engaged with the main frame to surround the subframe, and is fixable to a wall surface, wherein
   a clearance is provided between the outer case and the main frame, and the outer case is engaged with the main frame through a vibration isolating member
   wherein the pair of vibration tubes are composed of a fiber reinforced resin with respect to the vibration exciter and non-reinforced resin with respect to a connecting portion to the outer case.

5. The Coriolis mass flow meter according to claim 4, comprising:
- an arm, which extends from the main frame toward the depth of the subframe;
- a first seat, which is provided at the end of the arm, and on which the vibration isolating member can be seated;
- a window, which is formed in a portion of the outer case, corresponding to the first seat, and through which the vibration isolating member can be accessed; and
- a second seat, which is formed in the outer case and located adjacently to the window, and on which the vibration isolating member can be seated, wherein
- the vibration isolating member is detachably fixed to the first and second seats in the state of its one end being seated on the first seat and its other end being seated on the second seat.

6. The Coriolis mass flow meter according to claim 4, wherein the main frame is a plastic molded product, and the subframe is a molded product made of a lightweight metal.

7. The Coriolis mass flow meter according to claim 4, wherein at least the inner peripheral surface of the vibration tube is made of a plastic material having corrosion proof properties.

8. The Coriolis mass flow meter according to claim 4, wherein an inlet portion and an outlet portion of the vibration tube are made of an elastic plastic material.

* * * * *